United States Patent [19]

Massey et al.

[11] Patent Number: 5,238,112

[45] Date of Patent: Aug. 24, 1993

[54] FILE BOX FOR VIDEO CASSETTES

[75] Inventors: Carl D. Massey, Nashville; Jeffrey D. Bell, Unionville; Kenneth E. McDonald, Columbia, all of Tenn.; Thomas J. Bush, Canton Center, Conn.

[73] Assignee: Pelikan, Inc., Franklin, Tenn.

[21] Appl. No.: 992,815

[22] Filed: Dec. 16, 1992

[51] Int. Cl.5 .......................................... B65D 85/575
[52] U.S. Cl. ........................................ 206/387; 70/63; 206/523; 292/19; 312/9.53
[58] Field of Search ............... 206/387, 521, 523, 591, 206/592, 594; 312/9.9, 9.53, 9.54–9.57; 70/63, 69, 70; 292/19, 20

[56] References Cited

U.S. PATENT DOCUMENTS

| D. 312,430 | 11/1990 | Crowle . |
| 345,337 | 7/1886 | Tollner . |
| 457,741 | 8/1891 | Kimball . |
| 756,924 | 8/1904 | Wood . |
| 1,036,100 | 8/1912 | Hart . |
| 3,183,030 | 5/1965 | Schlueter . |
| 3,592,028 | 7/1971 | LaMonica . |
| 4,150,464 | 4/1979 | Tracy . |
| 4,689,861 | 9/1987 | Kopelowicz . |
| 4,696,401 | 9/1987 | Wallace ............... 206/591 |
| 4,712,280 | 12/1987 | Fildan . |
| 4,782,949 | 11/1988 | Berkman . |
| 4,819,801 | 4/1989 | Howard . |
| 4,821,882 | 4/1989 | Messina ............... 206/523 |
| 4,831,694 | 5/1989 | Kong . |
| 4,842,032 | 6/1989 | Mastronardo ........ 206/387 |
| 4,896,769 | 1/1990 | Merzon ................ 206/387 |
| 4,912,950 | 4/1990 | Crowle . |
| 4,986,419 | 1/1991 | Collett et al. ........ 206/387 |

Primary Examiner—Jimmy G. Foster
Attorney, Agent, or Firm—John F. A. Earley; John F. A. Earley, III

[57] ABSTRACT

A file box for video cassettes comprising a box, the box having a bottom panel, a rear wall panel, a top panel, a left side end cap, and a right side end cap, and a foam liner for covering inside surfaces of the top, bottom and rear panels. A door panel may be included for closing the opening in the front of the file box, and a latch for latching the door flap to the top panel and for closing the box. The foam liner has fingers which form individual compartments for holding the video cassettes firmly and resiliently in place.

11 Claims, 9 Drawing Sheets

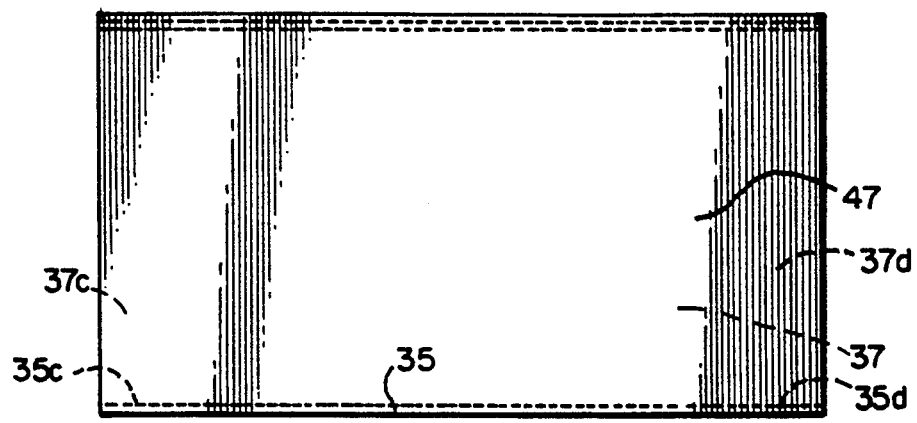
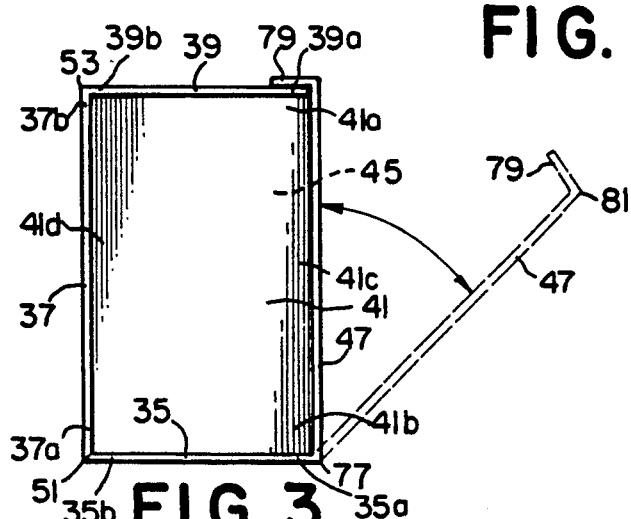
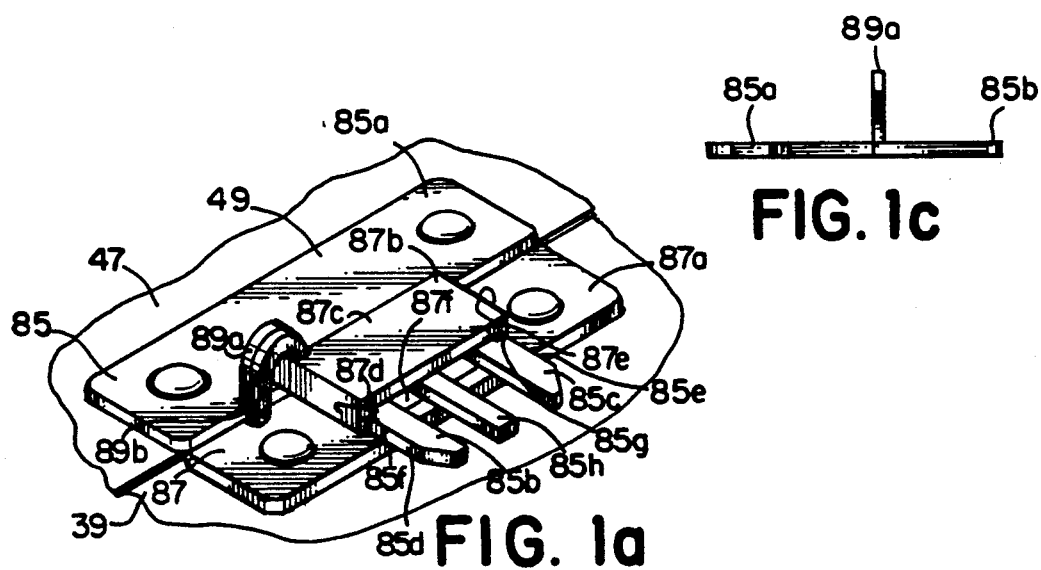

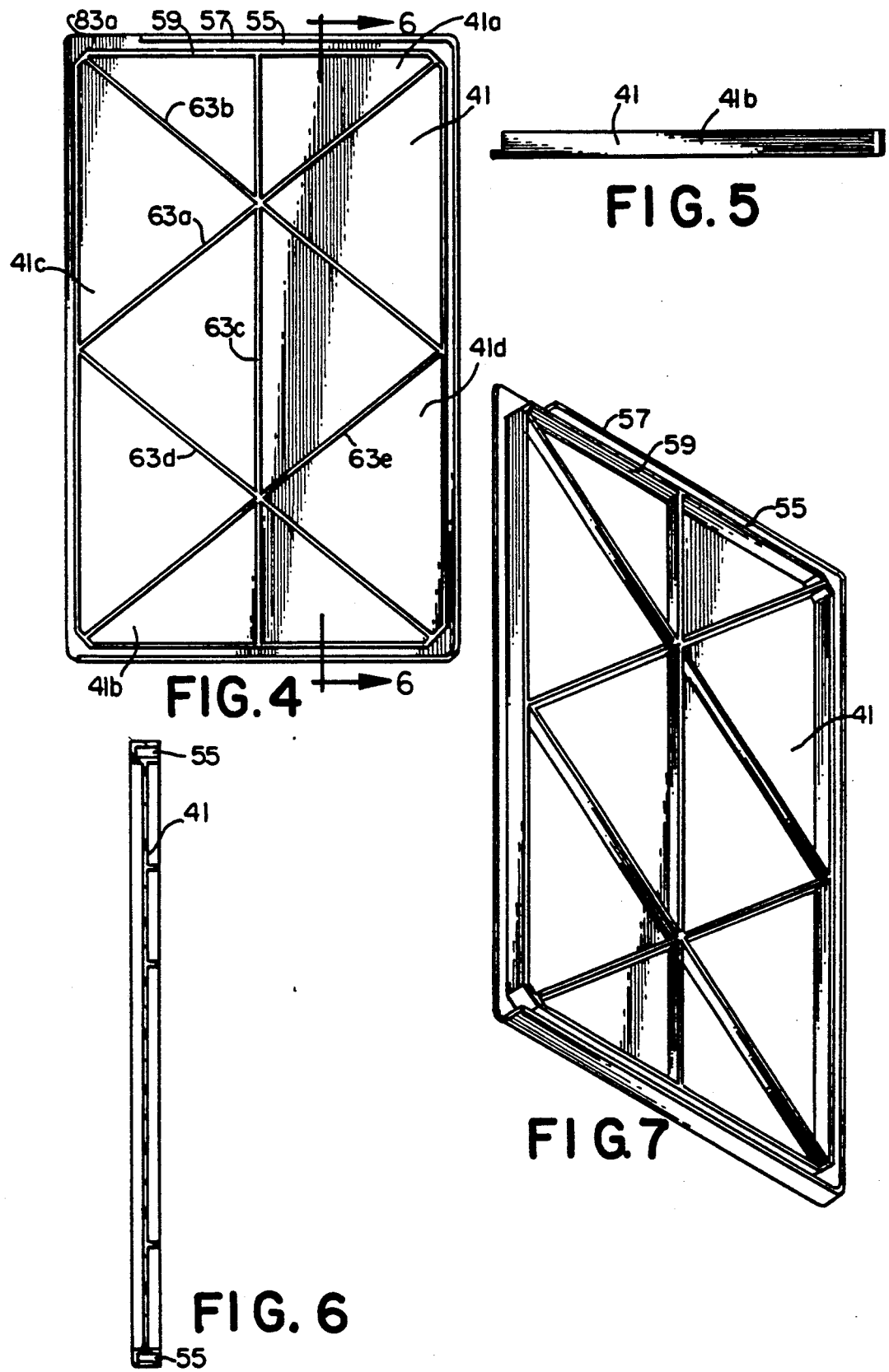

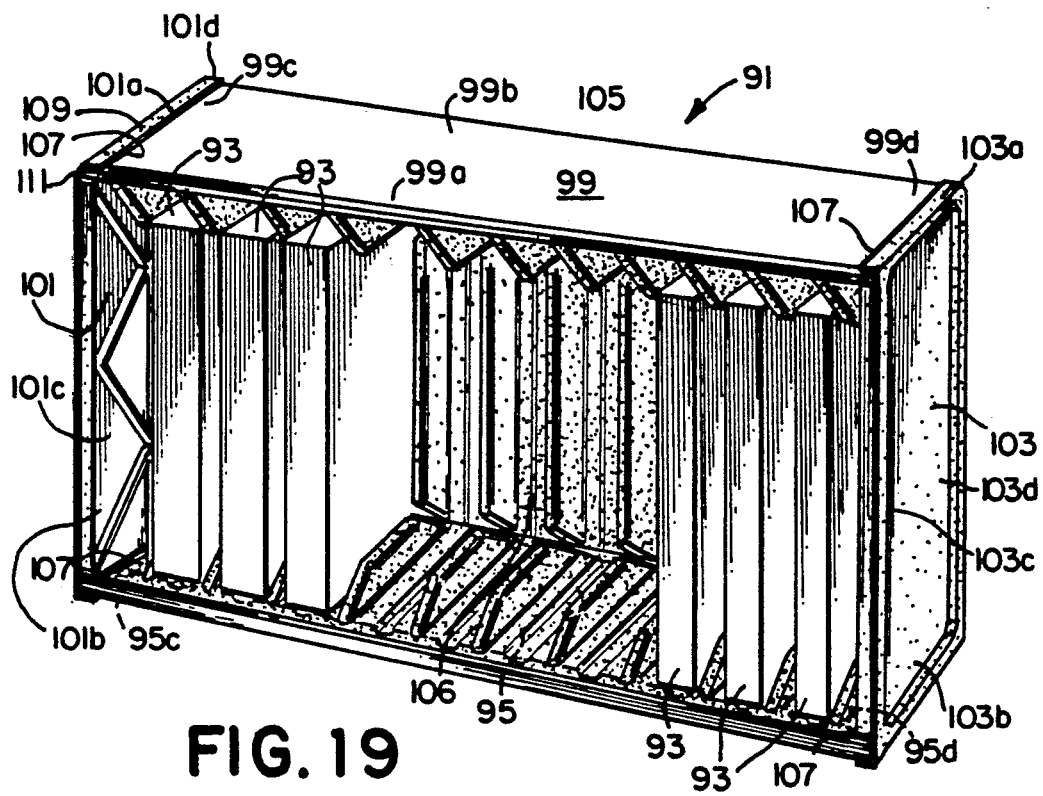
FIG. 19
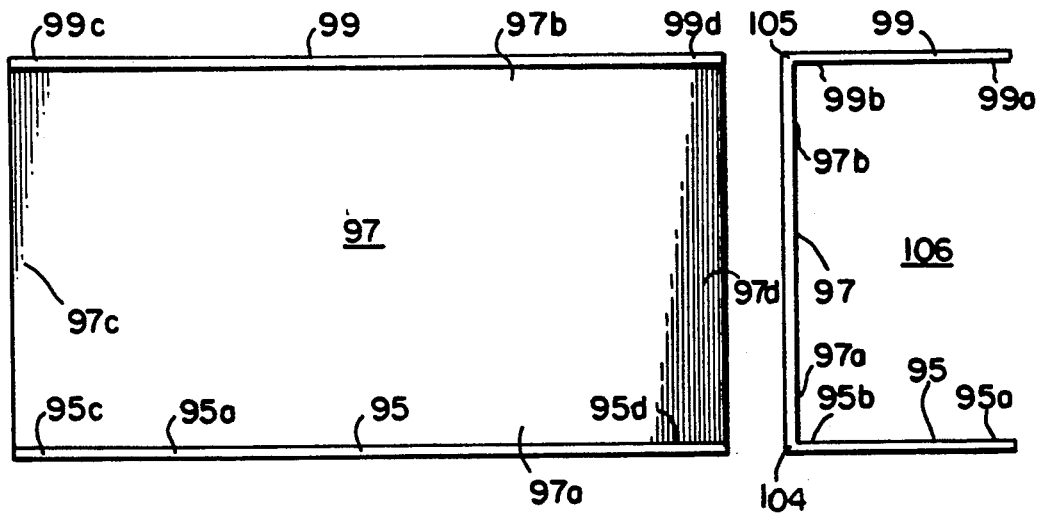
FIG. 20
FIG. 21

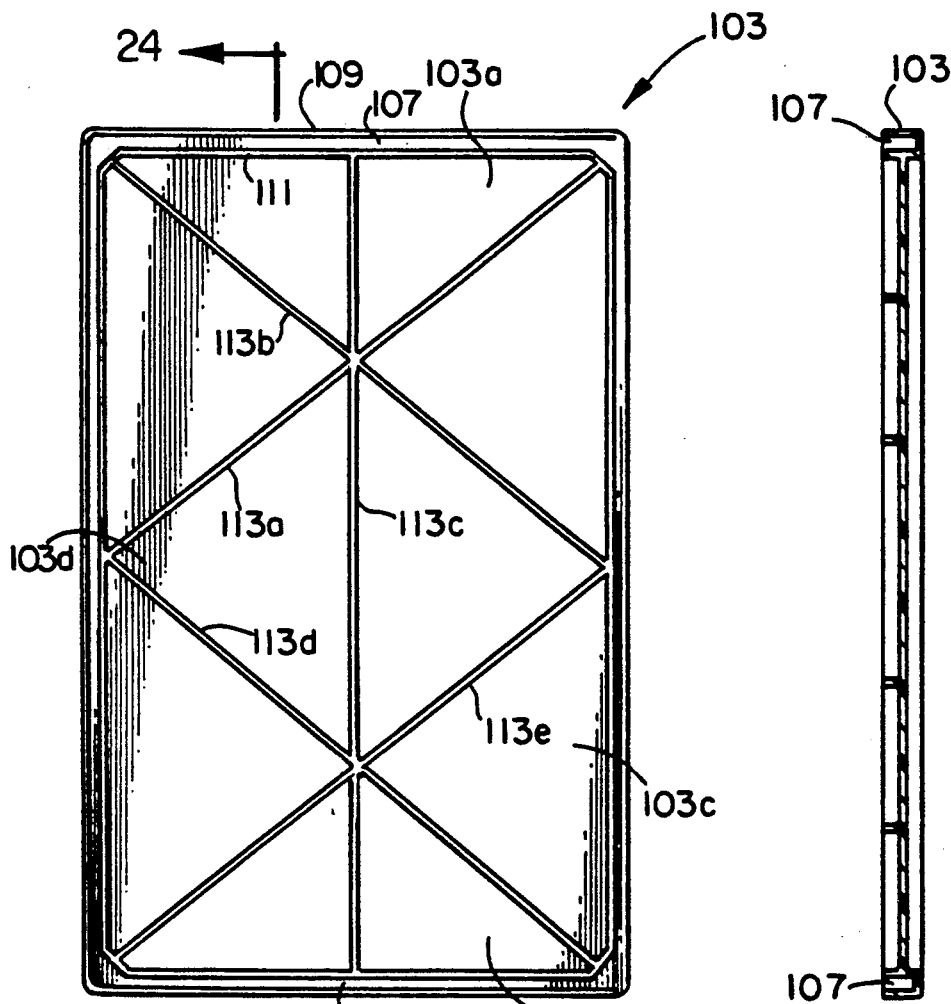

FILE BOX FOR VIDEO CASSETTES

CROSS-REFERENCE TO RELATED APPLICATIONS

This patent application is related to U.S. design patent application Ser. No. 07/882,097 filed May 11, 1992, for a design in a SNAP LOCK which is the same as the latch disclosed herein. The design patent application and this patent application are owned by the same assignee. The design patent application is incorporated herein by reference.

BACKGROUND OF THE INVENTION

1. Field of the Invention

This invention relates to file boxes for video cassettes, and more specifically concerns boxes which are easily assembled for storing video cassettes and for transporting them safely and conveniently.

2. Description of the Prior-Art

It has long been desired to have a storage facility for storing video cassettes safely in the recommended and preferred upright position. If a video cassette is stored in a horizontal position, there is always the chance that the tape of the video cassette will move out of position and cause binding and malfunction of the video cassette.

It has also been desired to provide a video tape storage facility which is portable and may easily be carried from place to place with the video cassettes stored safely inside.

It has also been desired to provide a storage box for video cassettes which holds the individual cassettes firmly and securely whether the video cassettes have been enclosed in their cover sleeves or not.

It has also been desired to provide a storage box for video cassettes which may be shipped to retail stores in flattened condition so as to save space in shipping, and may be stored in flattened condition, and may be placed on the store shelves in flattened condition so as to save space on the shelves.

It has also been desired to provide a file box for video cassettes which is easily assembled without the use of tools.

SUMMARY OF THE INVENTION

It is an object of this invention to provide an easily assembled file box for storing video cassettes and for transporting them, which may be shipped and stored in flat condition, and is easily assembled without tools.

It is another object of the invention to provide individual storage compartments for each video cassette which securely and firmly hold the video cassette in place, in the desired vertical position, whether the video cassette is encased in a paperboard sleeve or not.

In accordance with this and other objects of the invention, there is shown a storage box for video cassettes which comprises top, bottom, and rear walls with an open front, and two end caps which hold the box together. A door panel may also be provided, and a latch which holds the door closed, as well as a handle for easy carrying of the box. Also provided is a foam liner which has fingers between valleys that form individual compartments for individual video cassettes and holds them resiliently and firmly.

BRIEF DESCRIPTION OF THE DRAWINGS

FIG. 1a is a view in three dimensions of a latch which forms a part of the portable file box of the invention and shows a plug member inserted into a latch member.

FIG. 1b is a view in front elevation of the plug member of the latch of FIG. 1a.

FIG. 1c is a view in side elevation of the plug member of FIG. 1a and FIG. 1b.

FIG. 2 is a view in front elevation of the portable file box of FIG. 1 without the latch and end caps.

FIG. 3 is a view in side elevation of the file box of FIG. 2 and shows the file box in closed position in full lines, and in half open position in dash lines.

FIG. 4 is a view in elevation of the inside of the left end cap shown in FIG. 1.

FIG. 5 is a view in bottom plan of the end cap of FIG. 4 looking from the bottom of FIG. 4.

FIG. 6 is a view in section taken as indicated by the lines and arrows 6—6 which appear in FIG. 4.

FIG. 7 is a view in three dimensions of the inside of the left end cap of FIG. 1.

FIG. 19 is a three dimensional view of a file box for storing video cassettes constructed in accordance with the invention and shows top, rear, and bottom panels held by two end caps, and a liner in the box forming individual compartments for holding the video cassettes. FIG. 19 shows 6 video cassettes being stored in the box.

FIG. 20 is a view in front elevation and shows the top, rear, and bottom panels of the box of FIG. 19 without showing the end caps of the box and without showing the liner in the box.

FIG. 21 is a view in side elevation of the box components shown in FIG. 20.

FIG. 22 is a view in elevation of the inside of the right end cap of the box shown in FIG. 19. The left end cap is the same as the right end cap positioned upside down.

FIG. 23 is a view in top plan of the end cap of FIG. 22.

FIG. 24 is a view in section taken as indicated by the lines and arrows 24—24 which appear in FIG. 22.

DESCRIPTION OF THE PREFERRED EMBODIMENTS

Figure 1:
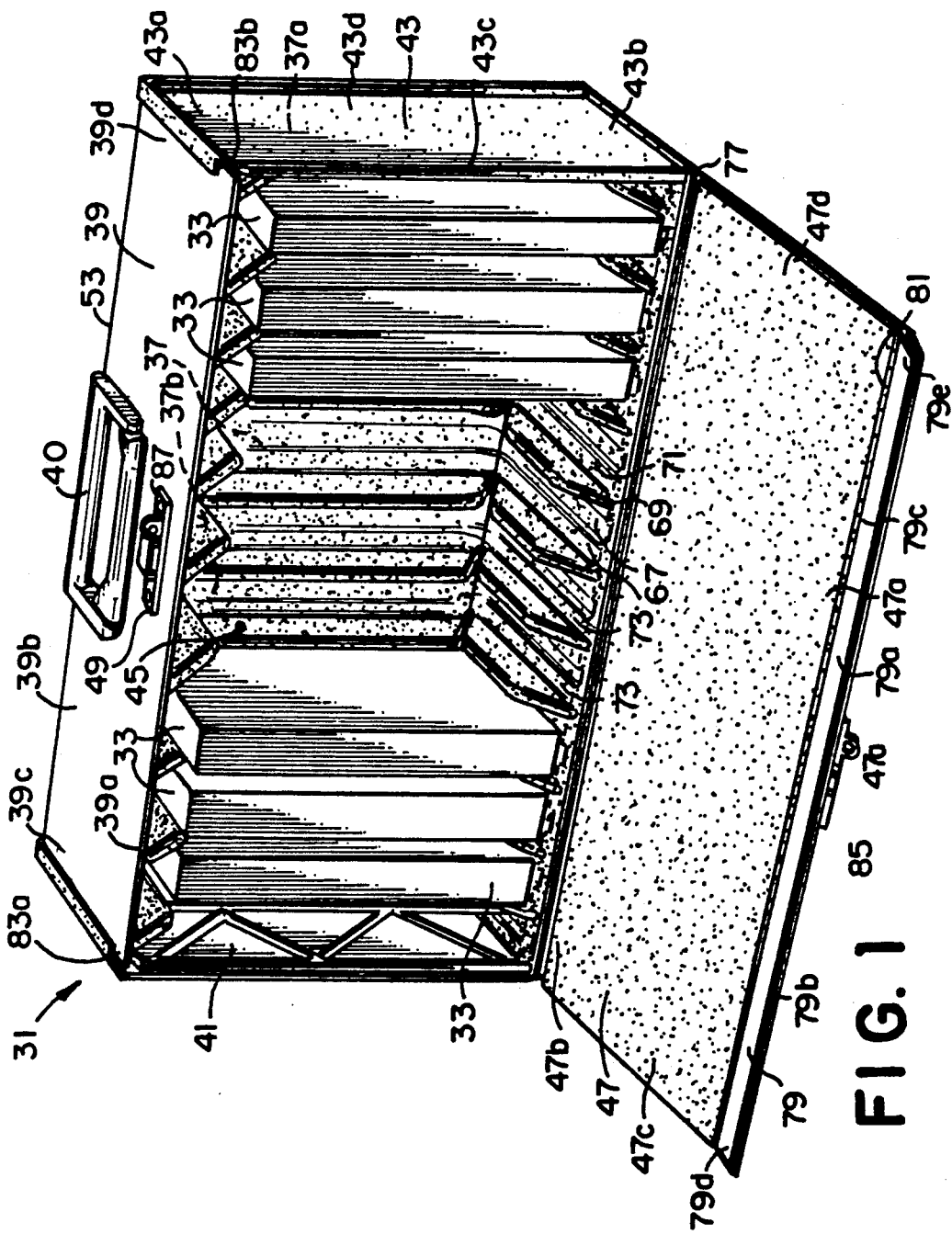
FIG. 1 is a view in three dimensions of the invention and shows a video cassette file box which has a handle and is portable and which includes a door panel.
Figure 8:
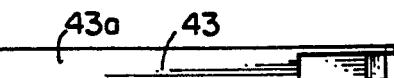
FIG. 8 is a view in three dimensions of the outside of the left end cap of FIG. 1.

Turning to FIGS. 1-18, there is shown a portable file box 31 constructed in accordance with the invention for storing and transporting video cassettes 33, which comprises a bottom panel 35, an upright rear wall panel 37, a top panel 39, a left side end cap 41, a right side end cap 43, an open front 45, a door panel 47 and a door flap 79.

More specifically, the portable file box 31 for video cassettes 33 includes bottom panel 35 with a front edge portion 35a, a rear edge portion 35b, and a pair of side edge portions 35c and 35d.

The rear wall panel 37 has a bottom edge portion 37a, a top edge portion 37b, and a pair of side edge portions 37c and 37d. The bottom edge portion 37a of the rear wall panel 37 is connected to the rear edge portion 35b of the bottom panel 35 along a crease line 51 with the rear wall panel 37 extending upright from the bottom panel 35.

The top panel 39 has an outer surface and a front edge portion 39a, a rear edge portion 39b, and a pair of side edge portions 39c and 39d. The rear edge portion 39b of the top panel 39 is connected along a crease line 53 to the top edge portion 37b of the rear wall panel 37 with the top panel 39 extending horizontally from the rear wall panel 37 and parallel to the bottom panel 35. Attached to the center of top panel 39 is a handle 40, and latch member 49.

The left side end cap 41 has a top edge portion 41a, a bottom edge portion 41b, a front edge portion 41c and a rear edge portion 41d. The top edge portion 41a of the left side end cap 41 is connected to the side edge portion 39c of the top panel 39. The rear edge portion 41d of the left side end cap 41 is connected to the side edge portion 37c of the rear wall panel 37. The bottom edge portion 41b of the left side end cap 41 is connected to the side edge portion 35c of the bottom panel 35.

The right side end cap 43 has a top edge portion 43a, a bottom edge portion 43b, a front edge portion 43c and a rear edge portion 43d. The top edge portion 43a of the right side end cap 43 is connected to the side edge portion 39d of the top panel 39. The rear edge portion 43d of the right side end cap 43 is connected to the side edge portion 37d of the rear wall panel 37. The bottom edge portion 43b of the right side end cap 43 is connected to the side edge portion 35d of the bottom panel 35. The open front 45 is formed by the front edge portion 39a of the top panel 39, the front edge portion 35a of the bottom panel 35, the front edge portion 41c of the left side end cap 41, and the front edge portion 43c of the right side end cap 43, for easy access to video cassettes 33 stored in the portable file box 31.

An inwardly facing groove 55 is formed in left end cap 41 between a first or outer ridge 57 and a second or inner ridge 59, and groove 55 extends along the top edge portion 41a, the rear edge portion 41d and the bottom edge portion 41b of the left side end cap 41. A similar groove 61 is formed in right end cap 43 along the top edge portion 43a, the rear edge portion 43d, and the bottom edge portion 43b of the right side end cap 43.

The grooves 55 and 61 are in the form of a U lying on its side.

The edge portion 39c of top panel 39 is seated in the groove 55 along the top edge portion 41a of the left side end cap 41, and the side edge portion 39d of the top panel 39 is seated in the groove 61 along the top edge portion 43a of the right side end cap 43. The side edge portion 37c of the rear wall panel 37 is seated in the groove 55 along the rear edge portion 41d of the left side end cap 41, and the side edge portion 37d of the rear wall panel 37 is seated in groove 61 along the rear edge portion 43d of the right side end cap 43. The side edge portion 35c of the bottom panel 35 is seated in the groove 55 along the bottom edge portion 41b of the left side end cap 41, and the side edge portion 35d of the bottom panel 35 is seated in the groove 61 along the bottom edge portion 43b of the right side end cap 43.

Figure 9:
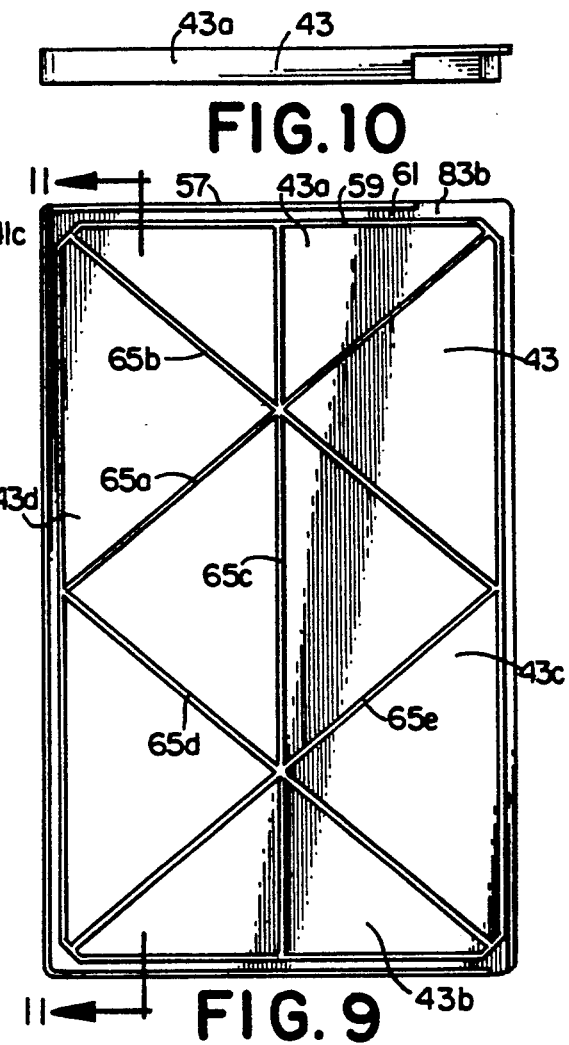
FIG. 9 is a view in elevation of the inside of the right end cap of FIG. 1.
Figure 10:
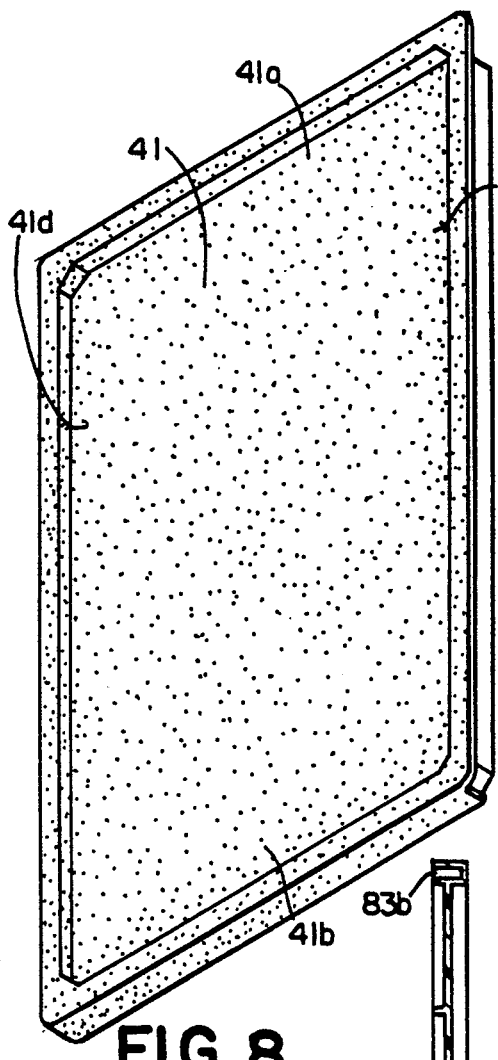
FIG. 10 is a view in top plan of the end cap of FIG. 9.
Figure 11:
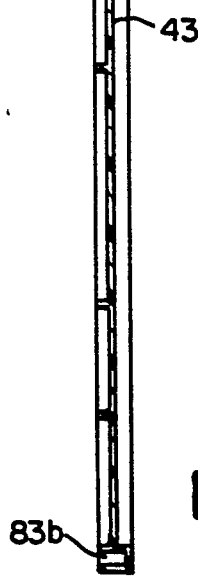
FIG. 11 is a view in section of the right end cap of FIG. 9 taken as indicated by the lines and arrows 11—11 which appear in FIG. 9.
Figure 12:
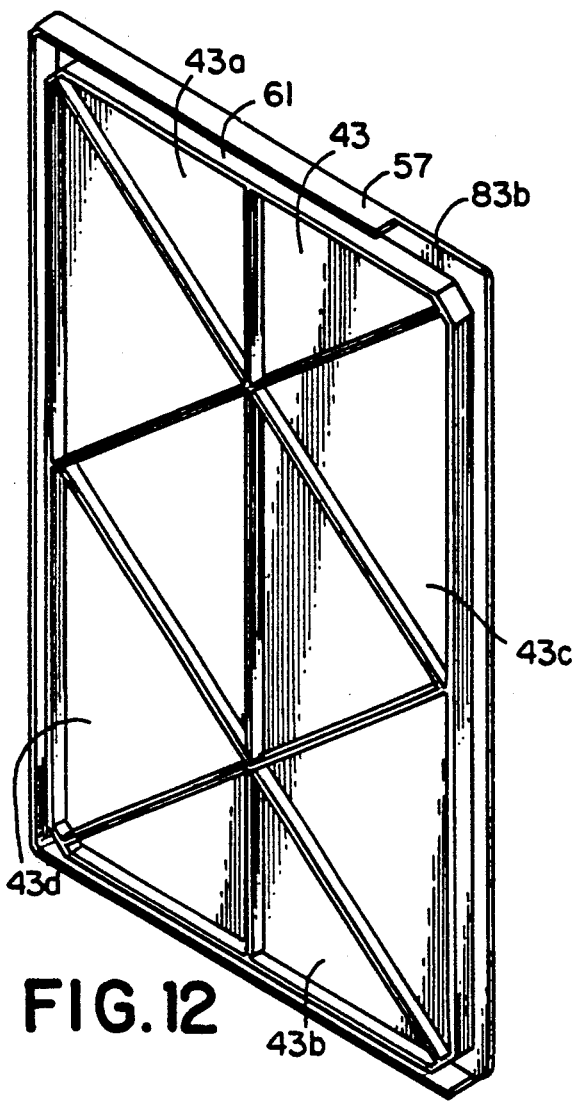
FIG. 12 is a view in three dimensions of the inside of the right end cap of FIG. 1.
Figure 13:
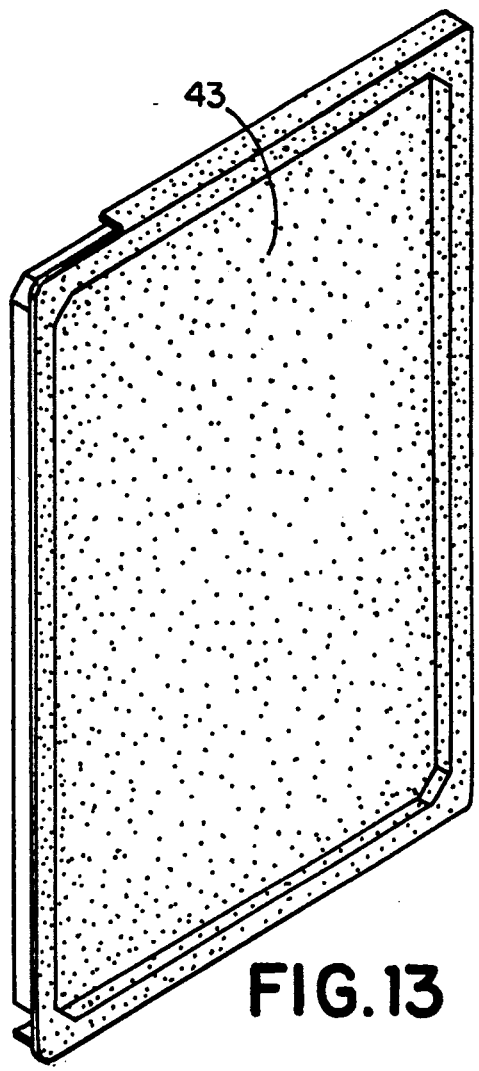
FIG. 13 is a view in three dimensions of the outside of the right end cap of FIG. 1.
Figure 15:
FIG. 15 is a partial view in side elevation of the liner of FIG. 14 looking from the bottom of FIG. 14.
Figure 16:
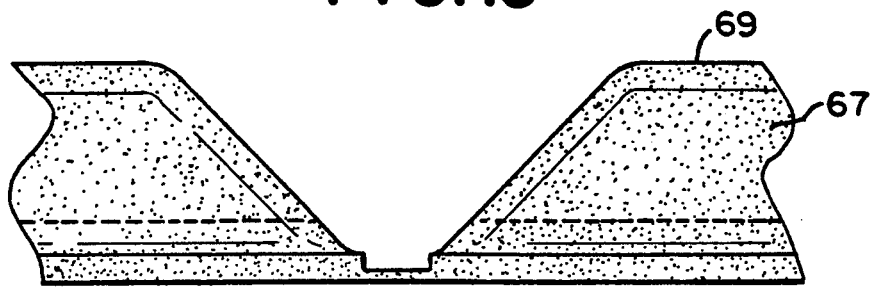
FIG. 16 is an enlarged partial view of a portion of the liner shown in FIG. 15.
Figure 14:
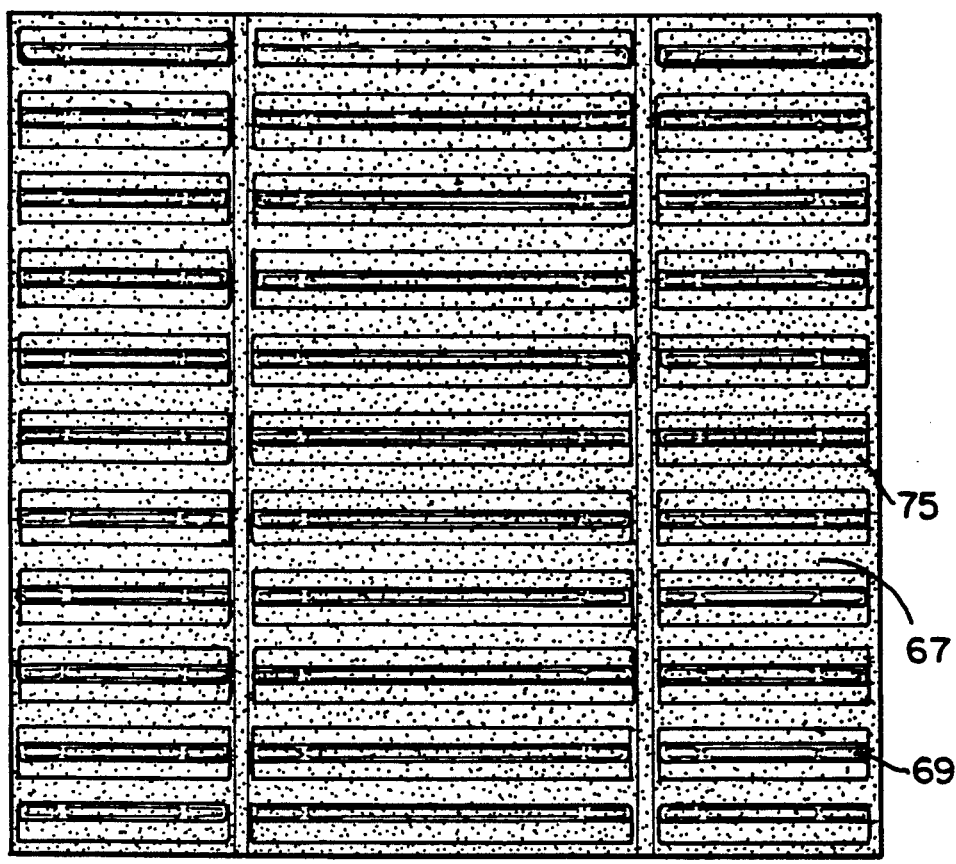
FIG. 14 is a view in top plan of the liner of the box and is shown in flat condition before insertion into the box.
Figure 17:
FIG. 17 is an end view of the liner shown in FIG. 14 looking from the right side of FIG. 14.
Figure 18:
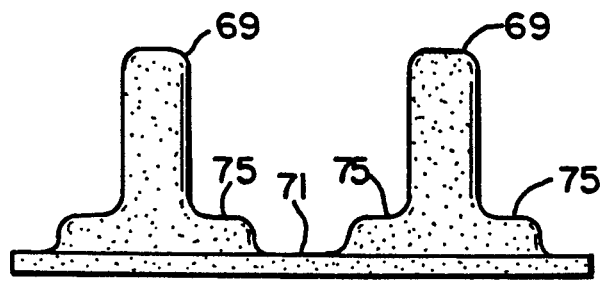
FIG. 18 is an enlarged partial view of the liner of FIG. 17 and shows construction details more clearly.
Figure 25:
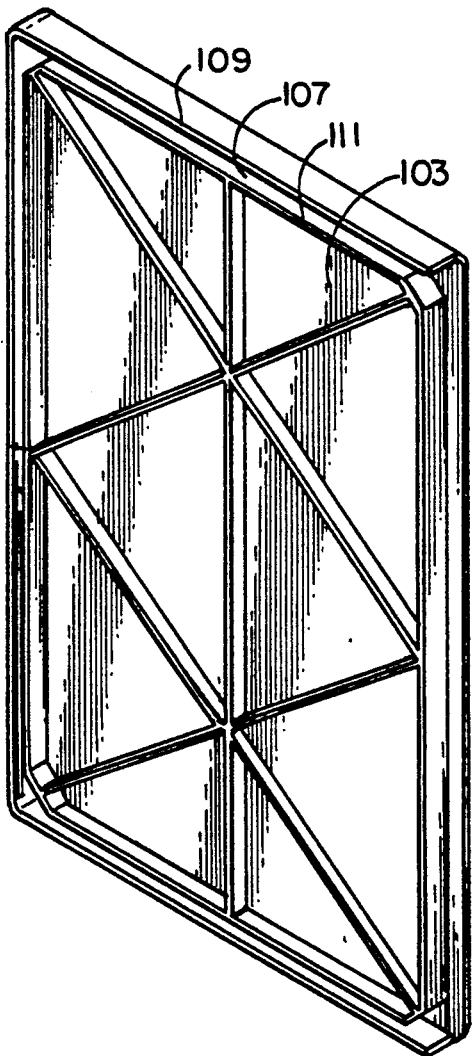
FIG. 25 is a view in three dimensions of the right end cap of FIG. 19 and shows the inside of the end cap.
Figure 26:
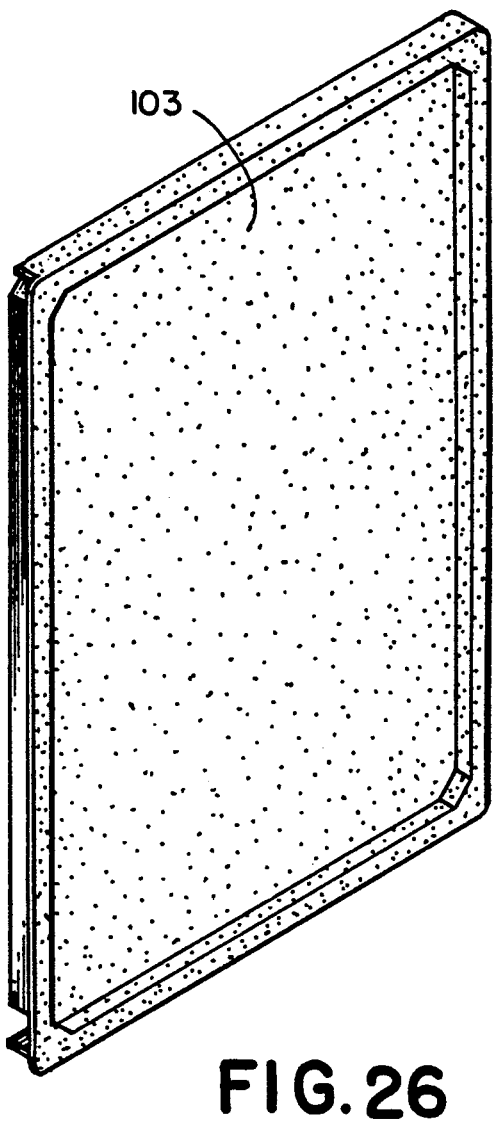
FIG. 26 is a three dimensional view of the right end cap of FIG. 19 and shows the outside of the end cap.

As shown in FIG. 4, reinforcing ribs 63a, 63b, 63c, 63d, and 63e extend between portions of the second or inner ridge 59 to reinforce the left side end cap 41, and as shown in FIG. 9, reinforcing ribs 65a, 65b, 65c, 65d, and 65e extend between portions of inner ridge 59 to reinforce the right side end cap 43.

A foam liner 67 which is made of a foamed synthetic plastic material is adhered to the inner surface of the file box 31 along bottom panel 35, rear wall panel 37, and top panel 39. The foam liner 67 includes foam fingers 69 which are separated by valleys 71. The foam fingers 69 extend inwardly from top panel 39, rear panel 37, and bottom panel 35 to form individual compartments 73 for receiving and firmly holding the video cassette 33. A step 75 is formed at the bottom of each finger 69 on both sides of the finger. With these foam steps 75, compartments 73 firmly and resiliently hold video cassettes 33 whether the cassettes 33 are covered by a paperboard sleeve or not. When the cassettes are covered by a sleeve, they compress the foam material of the steps 75 slightly more than if the video is placed in a compartment 73 without a sleeve.

As shown in FIG. 1, the door panel 47 has a top edge portion 47a, a bottom edge portion 47b, a left side portion 47c, and a right side portion 47d. The bottom edge portion 47b of the door panel 47 is connected along a crease line 77 to the front edge portion 35a of the bottom panel 35.

A door flap 79 is also provided and has an inner surface 79a and a front edge portion 79b, a rear edge portion 79c, a left side edge portion 79d, and a right side edge portion 79e. The front edge portion 79b of the door flap 79 is connected to a top edge portion 47a of the door panel 47 along the crease line 81 and the flap 79 overlaps the front edge portion 39a of the top panel 39.

The left side end cap 41 and the right side end cap 43 have an opening 83a, 83b in a top edge portions of the outer ridges 57 at the front edge portion 39a of the top panel 39 for receiving the door flap 79 so that the inner surface 79a of the door flap 79 may contact the outer surface of the top panel 39.

Turning now to FIGS. 1a-1c, there is shown the latch 49 which is connected between the door flap 79 and the top panel 39 for latching the door flap 79 to the to panel 39 holding closed the portable file box 31. The latch 49 comprises a plug member 85 and a socket member 87. The plug member 85 has a plate 85a and a pair of resilient side tongues 85b, 85c extending from the plate 85a with outside edges 85d, 85e. The side tongues 85b, 85c have hook portions 85f, 85g extending outwardly. The plug member 85 also includes a central, non-resilient tongue 85h extending from the plate 85a between the resilient side tongues 85b, 85c.

The socket member 87 has a plate 87a and a housing 87b on the plate 87a with a top wall 87c supported by two end walls 87d and 87e to form a slot 87f for receiving the tongues 85b, 85c. The slot 87f is slightly shorter in length than the distance between the outside edges of the side tongues 85b, 85c. Therefore, the slot end walls 87d, 87e press the side tongues 85b, 85c toward each other as the tongues are being inserted through the slot 87f. The tongues 85b, 85c spring away from each other when the tongue hook portions 85f, 85g are completely through the slot 87f and hook against the end walls 87d, 87e of the slot 87f to hold the latch 79 closed.

For security purposes, the portable file box 31 also includes locking members 89a, 89b for locking the latch 49 when the door panel 47 is closed. The locking member comprises an inverted-U-shaped member 89a formed on the plug member 85, and an inverted-U-shaped member 89b formed on the socket member 87. Locking members 89a, 89b are aligned with each other when the latch 49 is held closed by the tongue hook portions 85f, 85g and are adapted to receive a clasp of a padlock for locking the latch 49 closed.

In operation, the file box 31 is shipped flat, stored flat in a retail store, and easily assembled without tools by the purchaser. He takes the parts of the portable video cassette storage box 31 from its wrappings, erects the bottom, rear, and top wall panels 35, 37, 39, affixes the end caps 41, 43 and is ready to store video cassettes 33. The cassettes 33 are inserted into the individual compartments 73 where they are held firmly and resiliently by the foam liner 67 and its foam fingers 69 and steps 75.

Turning now to FIGS. 19-26, there is shown a file box 91 for video cassettes 93 comprising a bottom panel 95, a rear wall panel 97, a top panel 99, a left side end cap 101, and a right side end cap 103.

In particular, the bottom panel 95 has a front edge portion 95a, a rear edge portion 95b, and a pair of side edge portions 95c and 95d. The rear wall panel 97 has a bottom edge portion 97a, a top edge portion 97b, and a pair of side edge portions 97c and 97d. The bottom edge portion 97a of the rear wall panel 97 is connected to the rear edge portion 95b of the bottom panel 95 along a crease line 104 with the rear wall panel 97 extending upright from the bottom panel 95.

The top panel 99 has an outer surface and a front edge portion 99a, a rear edge portion 99b, and a pair of side edge portions 99c and 99d. The rear edge portion 99b of the top panel 99 is connected to the top edge portion 97b of the rear wall panel 97 along a crease line 105 with the top panel 99 extending horizontally from the rear wall panel 97 and parallel to the bottom panel 95.

The left side end cap 101 has a top edge portion 101a, a bottom edge portion 101b, a front edge portion 101c and a rear edge portion 101d. The top edge portion 101a of the left side end cap 101 is connected to the side edge portion 99c of the top panel 99. The rear edge portion 101d of the left side end cap 101 is connected to the side edge portion 97c of the rear wall panel 97. The bottom edge portion 101b of the left side end cap 101 is connected to the side edge portion 95c of the bottom panel 95.

The right side end cap 103 of FIGS. 22-26 has a top edge portion 103a, a bottom edge portion 103b, a front edge portion 103c and a rear edge portion 103d. The top edge portion 103a of the right side end cap 103 is connected to the side edge portion 99d of the top panel 99.

The rear edge portion 103d of the right side end cap 103 is connected to the side edge portion 97d of the rear wall panel 97. The bottom edge portion 103b of the right side end cap 103 is connected to the side edge portion 95d of the bottom panel 95.

An open front 106 is formed by the front edge portion 99a of the top panel 99, the front edge portion 95a of the bottom panel 95, the front edge portion 101c of the left side end cap 101, and the front edge portion 103c of the right side end cap 103, for easy access to video cassettes 93 stored in the file box 91.

An inwardly facing groove 107 is formed in end caps 101, 103 between an outer ridge 109 and an inner ridge 111. The groove 107 extends along the top edge portion 101a, bottom edge portion 101b, and rear edge portion 101d of the left side end cap 101, and along the top edge portion 103a, bottom edge portion 103b and rear edge portion 103d of the right side end cap 103.

The side edge portion 99c of the top panel 99 is seated in the groove 107 extending along the top edge portion 101a of the left side end cap 101, and the side edge portion 99d of the top panel 99 is seated in the groove 107 extending along the top edge portion 103a of the right side end cap 103. The side edge portion 97c of the rear wall panel 97 is seated in the groove 107 extending along the rear edge portion 101d of the left side end cap 101, and the side edge portion 97d of the rear wall panel 97 is seated in the groove 107 extending along the rear edge portion 103d of the right side end cap 103. The side edge portion 95c of the bottom panel 95 is seated in the groove 107 extending along the bottom edge portion 101b of the left side end cap 101, and the side edge portion 95d of the bottom panel 95 is seated in the groove 107 extending along the bottom edge portion 103b of the right side end cap 103.

Also shown are reinforcing ribs 113a, 113b, 113c, 113d and 113e which extend between portions of the inner ridge 111 to reinforce the left side end cap 101 and the right side end cap 103.

We claim:

1. A file box for video cassettes, comprising
  a box,
  said box having a bottom panel with a front edge portion, a rear edge portion, and a pair of side edge portions,
  a rear wall panel having a bottom edge portion, a top edge portion, and a pair of side edge portions,
  the bottom edge portion of the rear wall panel being connected to the rear edge portion of the bottom panel with the rear wall panel extending upright from the bottom panel,
  a top panel having an outer surface and a front edge portion, a rear edge portion and a pair of side edge portions,
  the rear edge portion of the top panel being connected to the top edge portion of the rear wall panel with the top panel extending horizontally from the rear wall panel and being parallel to the bottom panel,
  a left side end cap having a top edge portion, a bottom edge portion, a front edge portion, and a rear edge portion,
  the top edge portion of the left side end cap being connected to a side edge portion of the top panel,
  the rear edge portion of the left side end cap being connected to a side edge portion of the rear wall panel, the bottom edge portion of the left side end cap being connected to a side edge portion of the bottom panel, a right side end cap having a top edge portion, a bottom edge portion, a front edge portion, and a rear edge portion, the top edge portion of the right side end cap being connected to a side edge portion of the top panel, the rear edge portion of the right side end cap being connected to a side edge portion of the rear panel, the bottom edge portion of the right side end cap being connected to a side edge portion of the bottom panel, an open front formed by the front edge portions of the top panel, bottom panel and side end caps for easy access to video cassettes stored in the file box, a foam liner covering the inside surfaces of the top, bottom, and rear panels, said foam liner including foam fingers spaced apart by valleys and extending inwardly from the top, rear and bottom panels to form individual compartments for the video cassettes, a door panel having a top edge portion, a bottom edge portion, a left side edge portion, and a right side edge portion, the bottom edge portion of the door panel being connected to the front edge portion of the bottom panel along a crease line, and a door flap having an inner surface and a front edge portion, a rear edge portion, a left side edge portion, and a right side edge portion, the front edge portion of the door flap being connected to the top edge portion of the door panel along a crease line and overlapping the front edge portion of the top panel.

2. The file box for video cassettes of claim 1, including a step formed on the bottom of each finger for accommodating a video cassette with or without its casing.

3. The file box for video cassettes of claim 1, said end caps having an opening in a top edge portion of the outer ridge at the front edge portion of the top panel for receiving the door flap so that the inner surface of the door flap may contact the outer surface of the top panel.

4. The file box for video cassettes of claim 1, including latch means connected between the door flap and the top panel for latching the door to the top panel and closing the box.

5. The file box for video cassettes of claim 4, said latch means comprising a plug member having a plate and a pair of resilient side tongues with outside edges extending from the plate, said side tongues having hook portions extending outwardly, a socket member having a plate, a housing on the plate with the housing having a top wall with two ends, and end walls connected between each end of the top wall and the plate to form a slot for receiving the side tongues, said slot being slightly shorter in length than the distance between the outside edges of the side tongues so that the slot end walls press the side tongues toward each other as the side tongues are being inserted through the slot and so that the side tongues spring away from each other when the tongue hook portions are completely through the slot and hook against the end walls of the slot to hold the latch closed.

6. The file box for video cassettes of claim 5, the plug member further including a central, non-resilient tongue extending from the plate of the plug member between the resilient side tongues.

7. The file box for video cassettes of claim 5, further comprising locking means for locking the latch closed comprising a first inverted-U-shaped member formed on the plug member, and a second inverted-U-shaped member formed on the socket member and being aligned with said first inverted-U-shaped member when the latch is held closed by the tongue hook portions, whereby the locking means is adapted to receive a clasp of a lock through the aligned first and second inverted-U-shaped members for locking the latch closed.

8. A file box for video cassettes, comprising a box, said box having a bottom panel with a front edge portion, a rear edge portion, and a pair of side edges portions, a rear wall panel having a bottom edge portion, a top edge portion, and a pair of side edge portions, the bottom edge portion of the rear wall panel being connected to the rear edge portion of the bottom panel with the rear wall panel extending upright from the bottom panel, a top panel having an outer surface and a front edge portion, a rear edge portion and a pair of side edge portions, the rear edge portion of the top panel being connected to the top edge portion of the rear wall panel with the top panel extending horizontally from the rear wall panel and being parallel to the bottom panel, a left side end cap having a top edge portion, a bottom edge portion, a front edge portion, and a rear edge portion, the top edge portion of the left side end cap being connected to a side edge portion of the top panel, the rear edge portion of the left side end cap being connected to a side edge portion of the rear wall panel, the bottom edge portion of the left side end cap being connected to a side edge portion of the bottom panel, a right side end cap having a top edge portion, a bottom edge portion, a front edge portion, and a rear edge portion, the top edge portion of the right side end cap being connected to a side edge portion of the top panel, the rear edge portion of the right side end cap being connected to a side edge portion of the bottom panel, the bottom edge portion of the right side end cap being connected to a side edge portion of the bottom panel, an open front formed by the front edge portions of the top panel, bottom panel and side end caps for easy access to video cassettes stored in the file box, an inwardly facing groove formed between an outer ridge and an inner ridge extending along the top edge portion, rear edge portion, and bottom edge portions of each end cap with the groove being in the form of a U lying on its side, the edge portions of the top, rear and bottom panels being seated in said grooves of the end caps, reinforcing ribs extending between portions of said inner ridge to reinforce the end caps, said top, bottom, and rear panels having inside surfaces, and said box including a foam liner covering the inside surfaces of the top, bottom, and rear panels, said foam liner including foam fingers spaced apart by valleys and extending inwardly from the top, rear and bottom panels to form individual compartments for video cassettes, a step formed on the bottom of each finger for accommodating a video cassette with or without its casing, a door panel having a top edge portion, a bottom edge portion, a left side portion, and a right side portion, the bottom edge portion of the door panel being connected to the front edge portion of the bottom panel along a crease line, a door flap having an inner surface and a front edge portion, a rear edge portion, a left side edge portion, and a right side edge portion, the front edge portion of the door flap being connected to the top edge portion of the door panel along a crease line and overlapping the front edge portion of the top panel, said end caps having an opening in a top edge portion of the first ridge at the front edge portion of the top panel for receiving the door flap so that the inner surface of the door flap may contact the outer surface of the top panel, latch means connected between the door flap and the top panel for latching the door flap to the top panel and closing the box, said latch means comprising a plug member having a plate and a pair of resilient side tongues with outside edges extending from the plate, and a central, non-resilient tongue extending from the plate of the plug member between the resilient side tongues, said side tongues having hook portions extending outwardly, a socket member having a plate, and a housing on the plate with a top wall with two ehds, and slot end walls connected between each end of the top wall and the plate forming a slot for receiving the side tongues, said slot being slightly shorter in length than the distance between the outside edges of the side tongue so that the slot end walls press the side tongues toward each other as the side tongues are being inserted through the slot and so that the side tongues spring away from each other when the tongue hook portions are completely through the slot and hook against the end walls of the slot to hold the latch closed, and locking means for locking the latch closed comprising a first inverted-U-shaped member formed on the plug member and a second inverted-U-shaped member formed on the socket member and being aligned with said first inverted-U-shaped member when the latch is held closed by the tongue hook portions, whereby the locking means is adapted to receive a clasp of a lock through the aligned first and second inverted-U-shaped members for locking the latch closed.

9. A file box for video cassettes, comprising a box, said box having a bottom panel with a front edge portion, a rear edge portion, and a pair of side edges portions, a rear wall panel having a bottom edge portion, a top edge portion, and a pair of side edge portions, the bottom edge portion of the rear wall panel being connected to the rear edge portion of the bottom panel with the rear wall panel extending upright from the bottom panel, a top panel having an outer surface and a front edge portion, a rear edge portion and a pair of side edge portions, the rear edge portion of the top panel being connected to the top edge portion of the rear wall panel with the top panel extending horizontally from the rear wall panel and being parallel to the bottom panel, a left side end cap having a top edge portion, a bottom edge portion, a front edge portion, and a rear edge portion, the top edge portion of the left side end cap being connected to a side edge portion of the top panel, the rear edge portion of the left side end cap being connected to a side edge portion of the rear wall panel, the bottom edge portion of the left side end cap being connected to a side edge portion of the bottom panel, a right side end cap having a top edge portion, a bottom edge portion, a front edge portion, and a rear edge portion, the top edge portion of the right side end cap being connected to a side edge portion of the top panel, the rear edge portion of the right side end cap being connected to a side edge portion of the rear panel, the bottom edge portion of the right side end cap being connected to a side edge portion of the bottom panel, an open front formed by the front edge portions of the top panel, bottom panel and side end caps for easy access to video cassettes stored in the file box, and a foam liner covering the inside surfaces of the top, bottom, and rear panels, said foam liner including foam fingers spaced apart by valleys and extending inwardly from the top, rear and bottom panels to form individual compartments for the video cassettes.

10. The file box for video cassettes of claim 9, including a step formed on the bottom of each finger for accommodating a video cassette with or without its casing.

11. A latch for connecting a door to a file box for video cassettes, comprising a plug member having a plate and a pair of resilient side tongues with outside edges extending from the plate, and a central, non-resilient tongue extending from the plate of the plug member between the resilient side tongues, said side tongues having hook portions extending outwardly, a socket member having a plate, and a housing on the plate with a top wall with two ends, and end walls connected between each end of the top wall and the plate forming a slot for receiving the side tongues, said slot being slightly shorter in length than the distance between the outside edges of the side tongues so that the slot end walls press the side tongues toward each other as the side tongues are being inserted through the slot and so that the side tongues spring away from each other when the tongue hook portions are completely through the slot and hook against the end walls of the slot to hold the latch closed, and locking means for locking the latch closed, comprising a first inverted-U-shaped member formed on the plug member and a second inverted-U-shaped member formed on the socket member and being aligned with said first inverted-U-shaped member when the latch is held closed by the tongue hook portions, whereby the locking means is adapted to receive a clasp of a lock through the aligned first and second inverted-U-shaped members for locking the latch closed.

* * * * *